United States Patent
Jones et al.

(10) Patent No.: US 10,410,067 B2
(45) Date of Patent: *Sep. 10, 2019

(54) SYSTEMS AND METHODS FOR DETECTING VEHICLE ATTRIBUTES

(71) Applicant: Walmart Apollo, LLC, Bentonville, AR (US)

(72) Inventors: Nicholaus Adam Jones, Fayetteville, AR (US); Robert James Taylor, Rogers, AR (US); Aaron James Vasgaard, Fayetteville, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,361

(22) Filed: Dec. 4, 2018

(65) Prior Publication Data

US 2019/0102628 A1    Apr. 4, 2019

Related U.S. Application Data

(63) Continuation of application No. 15/632,912, filed on Jun. 26, 2017, now Pat. No. 10,176,383.

(Continued)

(51) Int. Cl.
*G06K 9/00*    (2006.01)
*G07B 15/00*    (2011.01)
(Continued)

(52) U.S. Cl.
CPC ..... *G06K 9/00771* (2013.01); *G06Q 30/0278* (2013.01); *G07C 5/08* (2013.01); *G07B 15/00* (2013.01)

(58) Field of Classification Search
USPC ....... 382/100, 103–106, 140, 155, 162, 168, 382/173, 180–181, 190, 199, 209, 219, (Continued)

(56) References Cited

U.S. PATENT DOCUMENTS 5,635,693 A * 6/1997 Benson ................. G07B 15/04
340/10.33
6,067,008 A * 5/2000 Smith ................. B60L 53/305
340/438

(Continued)

FOREIGN PATENT DOCUMENTS

JP    2009217601 A    9/2009

OTHER PUBLICATIONS

U.S. Appl. No. 15/632,912, filed Jun. 26, 2017, Nicholaus Adam Jones et al.

(Continued)

*Primary Examiner* — Seyed H Azarian
(74) *Attorney, Agent, or Firm* — McCarter & English, LLP; David R. Burns

(57) ABSTRACT

Described in detail herein are methods and systems for detecting attributes of vehicles using an images captured by an image capturing device disposed at a facility. The system detects attributes of the vehicles from the image, retrieves information associated with each vehicle based on the attributes and generates a score for each vehicle based on the information associated with each vehicle. Based on the score a distribution of physical objects is triggered to the facility.

14 Claims, 4 Drawing Sheets

Related U.S. Application Data

(60) Provisional application No. 62/362,295, filed on Jul. 14, 2016.

(51) Int. Cl.
*G07C 5/08* (2006.01)
*G06Q 30/02* (2012.01)

(58) Field of Classification Search
USPC ....... 382/224, 232, 254, 274, 276, 286–291, 382/312, 321; 340/10.33, 438; 368/90; 320/109; 705/14.39, 26.1, 13
See application file for complete search history.

(56) References Cited

U.S. PATENT DOCUMENTS

| | | | |
|---|---|---|---|
| 8,335,711 B2 * | 12/2012 | Burdick | G06Q 20/20 368/90 |
| 8,595,079 B1 * | 11/2013 | Raines | G06Q 30/0201 705/26.1 |
| 8,812,355 B2 | 8/2014 | Angell et al. | |
| 2008/0249859 A1 * | 10/2008 | Angell | G06Q 30/02 705/14.39 |
| 2015/0125042 A1 | 5/2015 | Haden et al. | |
| 2015/0193726 A1 | 7/2015 | Simmons | |
| 2016/0144735 A1 * | 5/2016 | Haddad | B60L 53/665 320/109 |

OTHER PUBLICATIONS

ITunes Preview, Parking Lot Manager on the App Store, https://itunes.apple.com/us/app/parkinglotmanager/id485060017?mt=8, 2016.

* cited by examiner

SYSTEMS AND METHODS FOR DETECTING VEHICLE ATTRIBUTES

CROSS-REFERENCE TO RELATED PATENT APPLICATIONS

This application is a continuation of U.S. patent application Ser. No. 15/632,912 filed Jun. 26, 2017, which claims priority to U.S. Provisional Application No. 62/362,295 filed on Jul. 14, 2016, the content of each application is hereby incorporated by reference in its entirety.

BACKGROUND

Disparities or likenesses between different geographic locations can be important in determining information about the geographic locations. While demographics and statistical data can provide some information about different geographic locations. Generalized data can fail to accurately capture information about subsets of the population and/or individual characteristics of the population.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
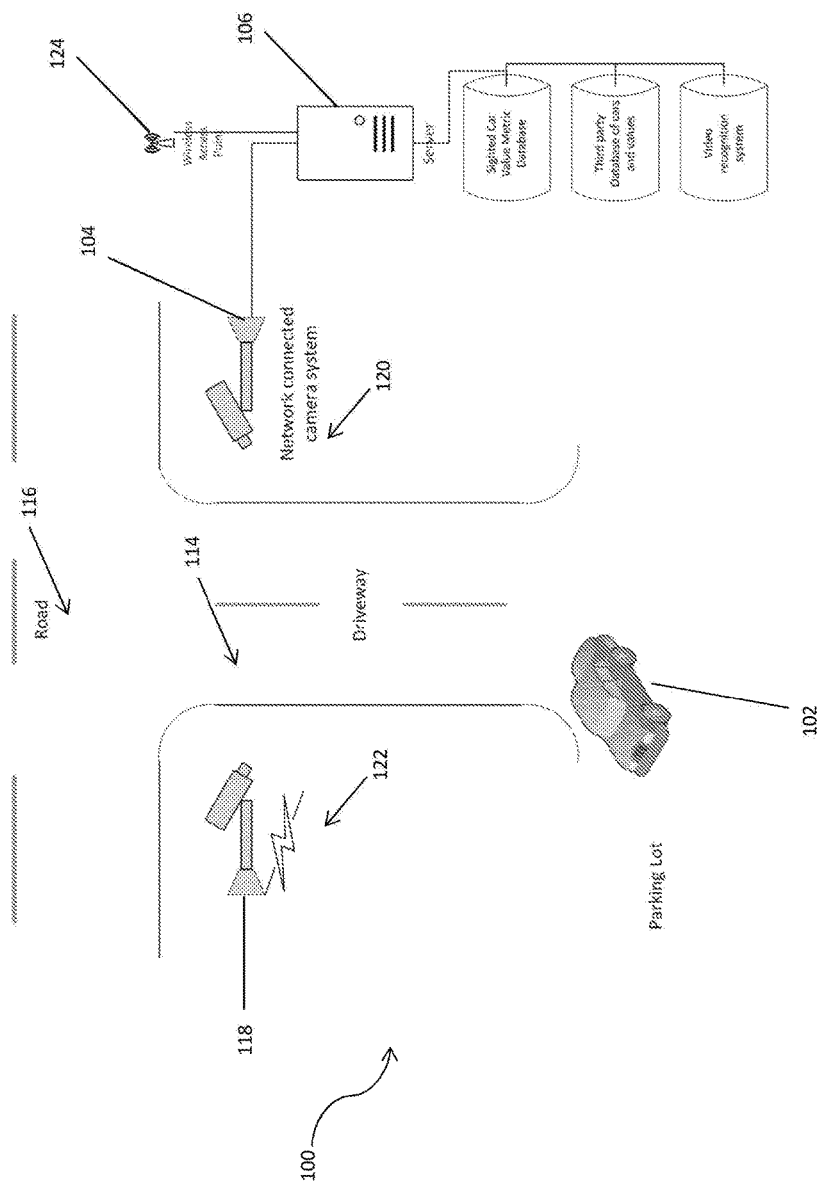
FIG. 1 is a block diagram of an exemplary portion of a distributed vehicle attribute detection system according to the present disclosure.

Described in detail herein are methods and systems for detecting shared attributes of vehicles at geographically distributed locations using images captured by image capturing devices disposed at each of the geographically distributed locations. The system detects attributes of the vehicles from the images, retrieves information associated with each vehicle based on the attributes and generates a score for each vehicle based on the information associated with each vehicle. Based on the score a distribution of physical objects can be triggered to one or more of the geographically distributed locations.

In exemplary embodiments, a distributed vehicle detection system can include a first image capturing device disposed at a first location of a first facility and a second image capturing device disposed at a second location of a second facility, where the first facility and the second facility are geographically separated. The first image capturing device can be configured to detect at least a first vehicle in response to the first vehicle entering a first field of view of the first image capturing device and to capture an image of the first vehicle (e.g., a first image). The second image capturing device can be configured to detect at least a second vehicle in response to the second vehicle entering a second field of view of the second image capturing device and to capture an image of the second vehicle (e.g., a second image). The first vehicle and second vehicle can be detected by the first image capturing device and the second image capturing device, respectively, based on a change to at least one pixel in the first field of view or the second field of view, respectively. The first and second image capturing devices are at least one of moving image cameras or still image cameras.

A computing system can be operatively coupled to the first and second image capturing devices (e.g., via a communications network). The computing system can be configured to discriminate between a first set of vehicle attributes associated with the first vehicle based on the first image and to discriminate between a second set of vehicle attributes associated with the second vehicle. The computing system can determine whether the first vehicle and the second vehicle have comparable vehicle attributes. In response to determining that the first and second vehicles have comparable attributes, the computing system can trigger a distribution of physical objects to the first facility or the second facility based on the comparable attributes between first plurality of vehicle attributes and the second plurality of vehicle attributes. The vehicle attributes can include, for example, a body type, a cleanliness, custom parts, a condition of the vehicle, a type of rims on the vehicle, or a type of tire on the vehicle.

The computing system can be operatively coupled to a plurality of databases and can access a first one of the databases to retrieve information associated with the at least one of the set of vehicle attributes associated with the first vehicle and/or the second, generate a score based on the information associated with the at least one of the set of vehicle attributes, query a second one of the databases for physical objects based on the score, and query a third one of the databases for a quantity of the physical objects disposed at the first facility. In response to determining the quantity of the physical objects at the first facility is less than a predetermined quantity, the computing system can trigger distribution of a first quantity of physical objects to the first facility. In exemplary embodiments, the information associated with the first and second vehicle includes a value of the first vehicle or a value of at least one of the vehicle attributes.

The computing system can be configured to generate a score associated with the second vehicle (e.g., a second score). In response to determining the score of the second vehicle being equal to or with a threshold percentage of the score of the first vehicle, the computing system can query the third one of the databases to determine whether a second quantity of the physical objects is at the second facility. In response to determining the second quantity of the physical objects at the second facility is less than the second quantity, the computing system can trigger distribution of the first quantity to the second facility.

FIG. 1 is a block diagram of an exemplary instance of a vehicle detection system 100 at a facility according to the present disclosure. The vehicle detection system 100 includes a first image capturing device 104 disposed at a first location 120 outside the facility and a second image capturing device 118 disposed at a second location 122 outside the facility. In some embodiments, the facility can include more or fewer image capturing devices. For example, the facility can include one or more (e.g., 1 to 10 or more image capturing devices). The first and second image capturing devices 104, 118 can be cameras configured to capture moving or still images. The first and second image capturing devices 104, 118 are configured to detect vehicles in response to the vehicles entering a field of view of the first or second image capturing devices 104, 118 and to capture images of the vehicles in response to the detection. The first and second image capturing devices 104, 118 can detect the vehicles based on changes in pixels in the field of view. For example, a vehicle 102 can turn from the road 116 onto the driveway 114. As the vehicle 102, passes by the first and second image capturing devices 104, 118, the vehicle 102 enters the field of view of the first and second image capturing device 104, 118 resulting in a change to at least one pixel in the first image capturing device 104 and a change to at least one pixel in the second image capturing device 118. The change in the pixels of the first and second image capturing device 104, 118 can trigger the image capturing devices to capture and record images in the first and second fields of view, respectively, for a specified time period and/or until the vehicle moves completely through the first field of view and the second field of view respectively. The first and second image capturing devices 104, 118 can capture multiple images of the vehicle from various angles/profiles such as, front, back, top and left and right sides. The images can include partial and entire views of the vehicle 102.

The first and second image capturing devices 104, 118 can be operatively coupled to a server 106 through a wireless access point 124. In some embodiments, the first and second image capturing devices 104, 118 can be connected to the wireless access point 124 using Near Field Communication (NFC) such as Bluetooth® and/or using a WiFi connection. The server 106 can be in communication with one or more remote server via a communications network, as described herein with reference to FIG. 2.

Figure 2:
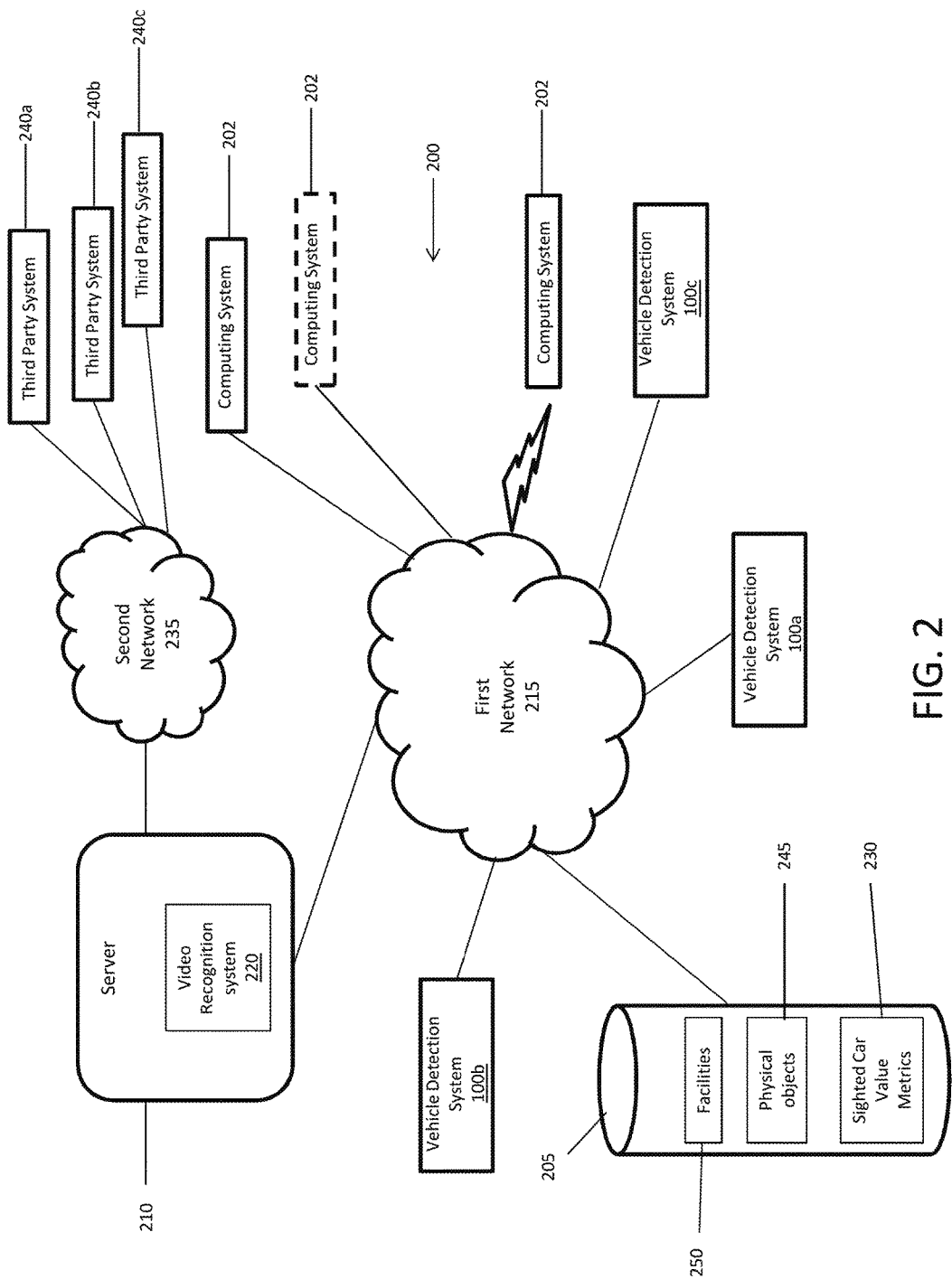
FIG. 2 illustrates a distributed vehicle attribute detection system in accordance with exemplary embodiments of the present disclosure.

FIG. 2 illustrates an exemplary distributed vehicle attribute detection system 200 according to exemplary embodiments. In exemplary embodiments, the distributed vehicle attribute detection system 200 includes computing systems 202, databases 205, a server 210, and multiple instances of the vehicle detection system 100 (referred to herein as vehicle detection systems 100a-c). The computing systems 202, databases 205, a server 210, and the vehicle detection systems 100a-c are communicatively coupled to each other via a communications network 215. Each of the vehicle detection systems 100a-c can be at different facilities in different geographic locations (e.g., New York, California, Jacksonville, Ala. and Chicago, Ill.). The server 210 is in communication with multiple third party systems such as Third Party Systems 240a-c, via a second communications network 235.

In an example embodiment, one or more portions of the first communications network 215 and second communications network 235 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing systems 202 and the databases 205, via the network 215. The server 210 hosts one or more applications configured to interact with one or more components computing system 200 and/or facilitates access to the content of the databases 205. The server can also host the video recognition system 220 discussed herein. The databases 205 may store information/data, as described herein. For example, the databases 205 can include a physical object database 245, the facilities database 250 and sighted car value database 230. The databases 205 and server 210 can be located at one or more geographically distributed locations from each other or from the computing system 202. Alternatively, the databases 205 can be included within server 210.

In exemplary embodiments, the computing system 202 can receive multiple images from each of the vehicle detection systems 100a-c. For example, the computing system 202 can receive a first image from the vehicle detection system 100a and a second image from the vehicle detection system 100c. The first image can include an image of a first vehicle at a first facility and the second image can include an image of the second vehicle at a second facility.

Upon receiving the first and second images, the computing system 200 can execute the video recognition system 220 residing on the server 210. The video recognition system 220 can extract attributes of the first and second vehicles from their respective images. The video recognition system 220 can extract a set of attributes associated with the vehicles from the image using image/video analytics or machine vision on the images of the vehicles. The types of machine vision can be implemented by the video recognition system 220 include but are not limited to: Stitching/Registration, Filtering, Thresholding, Pixel counting, Segmentation, Inpainting, Edge detection, Color Analysis, Blob discovery & manipulation, Neural net processing, Pattern recognition, Optical character recognition, and/or Gauging/Metrology. The vehicle attributes that can be detected can include but are not limited to: a body type, a cleanliness, custom parts, a condition of the vehicle, a type of rims on the vehicle, and/or a type of tire on the vehicle.

The video recognition system 220 can query the Sighted Car Value Metrics database 230 to retrieve information associated with the first and second vehicles based on the extracted attributes. The information associated with the first and second vehicle can include but is not limited to a value of the vehicle or a value of at least one of the extracted attributes.

In some embodiments, the video recognition system 220 can query databases of multiple third party systems 240a-c, via the second communications network 235, to retrieve information associated with the first and second vehicle. For example, the video recognition system 220 can detect that a vehicle has a Honda® emblem and a specific body type (e.g., coupe, sedan, truck, convertible, etc.). The video recognition system 220 can also form a figure-print style recognition process. For example, the video recognition system 220 can detect a first set of attributes associated with the vehicle. The first set of attributes can be broader attributes such as size, angle of the hood, dimensions and/or color. The video recognition system 220 can also detect a second set of attributes, which are narrower in scope. For example, the second set of attributes can include, the vehicle emblem, body type, type of wheels. The video recognition system 220 can iteratively detect more sets attributes associated with the vehicle. Each set of attributes would be more narrow than in scope than the previous.

The video recognition system 220 can form a query to a third party system 240b which includes a database of all Honda® cars. The third party system 240b can return, the year, type of car and value of car based on the attributes provided. In some embodiments, the Sighted Car Value Metrics 230 or the third party systems 240a-c can correlate the extracted attributes to a Kelly Blue Book Value, Edmunds value, and/or NADA value of a vehicle. In some embodiments, the video recognition system 220 can use a web-crawler to search multiple third party systems for information associated with Honda® vehicles.

In response to the video recognition system 220 retrieving information associated with the first and second vehicle based on the first and second images, the computing system 202 can generate a score for the first and second vehicles based on the retrieved information. The computing system 202 can use the score of the first vehicle to query the physical objects database 245 to retrieve a list of physical objects that correlate with the score of the first vehicle. The computing system 202 can query the facilities database 250 to determine the quantity of each of the physical objects disposed at the first facility from the list of physical objects that correlate with the score of the first vehicle. In response to determining the quantity of one or more of the physical objects is less than a predetermined amount, the computing system 202 can trigger a replenishment of the physical objects to the first facility.

The computing system 202 can trigger the replenishment of certain physical objects disposed at the second facility based on the score of the second vehicle using the same process of querying the physical objects database 245 and the facilities database 250 to determine the presence of certain physical objects in the second facility and compare the quantity of physical objects disposed at the second facility with the list of physical objects that correlate with the score of the second vehicle.

The computing system 202 can also compare the scores of the first vehicle and the second vehicle. If the scores of the first and second vehicle are equal or within a predetermined range of one another, the computing system 202 can query the facilities database 250 to compare the physical objects disposed at the first facility and the second facility. The computing system 202 can determine one or more physical objects disposed at the first facility which are not present at the second facility. Based on the determination that the one or more physical objects are not present at the second facility, the computing system 202 can trigger a delivery of the one or more physical objects not present at the second facility, to the second facility.

As a non-limiting example, the first and second facility can be a first retail store and a second retail store. The computing system 202 can receive a first image of the first vehicle at the first retail store and a second image of a second vehicle at the second retail store. The video recognition system 220 can determine the first vehicle is a 2010 BMW® 328i in excellent condition with custom rims, and a clean exterior and the second vehicle is a 2011 Mercedes Benz® E350 in excellent condition with custom rims and a clean exterior using the recognition process described above. The video recognition system 220 can also determine a value for the 2010 BMW® 328i and the 2011 Mercedes Benz® E350 while taking into consideration the condition, custom rims, and clean exterior of the vehicles. The computing system 202 can generate a score for each of the vehicles depending on the value of the vehicles or their attributes (e.g., the custom rims). In this non-limiting example, the score for the 2010 BMW® 328i and the 2011 Mercedes Benz® E350 can be the equal or within a predetermined range of one another.

The computing system 202 can query the physical objects database 245 to retrieve a list of products correlate with the score of the 2010 BMW® 328i vehicle. For example, due to a high value of the 2010 BMW® 328i vehicle, the computing system 200 can generate a high score. Based on the high score, the physical objects database 245 can return a list of high-end luxury products. The computing system 200 can query the facilities database 250 to determine the quantity of each of the products sold at the first retail store from the list of products that correlate with the score of the 2010 BMW® 328i vehicle. The computing system 202 can determine one or more products at the first retail store included in the list have a current inventory that is below a predetermined amount. The computing system 202 can trigger an order for more of the one or more products determined to have a quantity less than a predetermined amount at the first facility. For example, the computing system 202 can determine the first retail store should store a predetermined amount of luxury car wax based on the list of products which are correlated to the score of the 2010 BMW® 328i. The computing system 202 can automatically order more luxury car wax for the first retail store if it is below the predetermined amount.

The computing system 202 can trigger an order of certain products to the second retail store based on the score of the 2011 Mercedes Benz® E350 vehicle using the same process of querying the physical objects database 245 and the facilities database 250 to determine presence of certain products disposed in the second facility compare the quantity of products disposed at the second facility with the list of products that correlate with the score of the 2011 Mercedes Benz® E350 vehicle.

The computing system 200 can also compare and determine the scores of the 2010 BMW® 328i and the 2011 Mercedes Benz® E350 are equal or within a predetermined range of one another. The computing system 202 can query the facilities database 250 to determine and compare the products sold at the first retail store and second retail store. For example, the computing system 202 can determine the first retail store sells a luxury car wax and the second retail store does not sell the luxury car wax. Based on the determination, the computing system 202 can order luxury wax for the second retail store.

Figure 3:
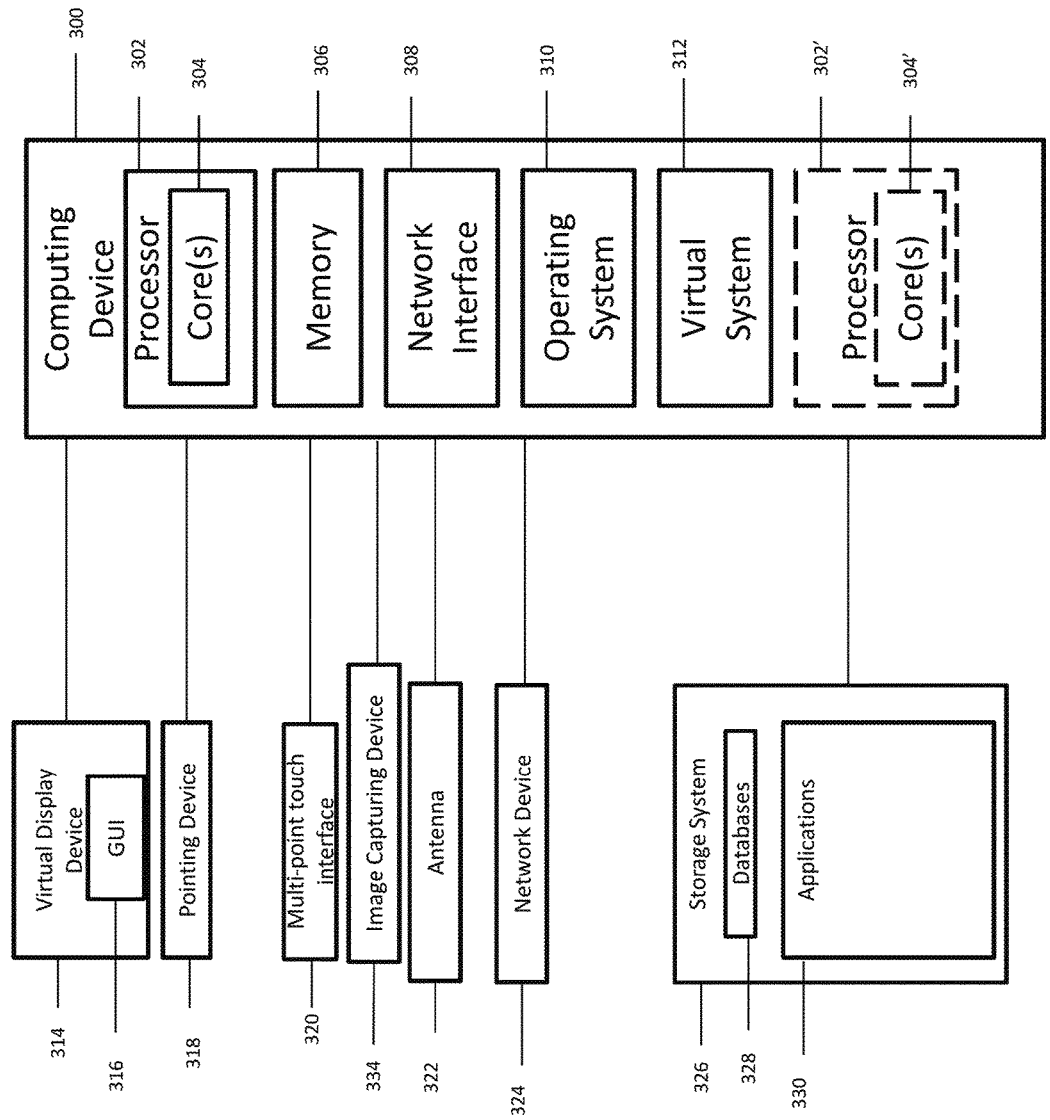
FIG. 3 illustrates an exemplary computing system in accordance with exemplary embodiments of the present disclosure.

FIG. 3 is a block diagram of an example computing device for implementing exemplary embodiments of the present disclosure. Embodiments of the computing device 300 can implement embodiments of the computing systems 202 shown in FIG. 2. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (404 and 404') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 406 may include other types of memory as well, or combinations thereof.

The computing device 300 can receive data from input/output devices such as, an image capturing device 334.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects. The databases 328 may be updated manually or automatically at any suitable time to add, delete, and/or update one or more data items in the databases. The databases 328 can include information such as physical object information 220 and physical object metrics 230.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
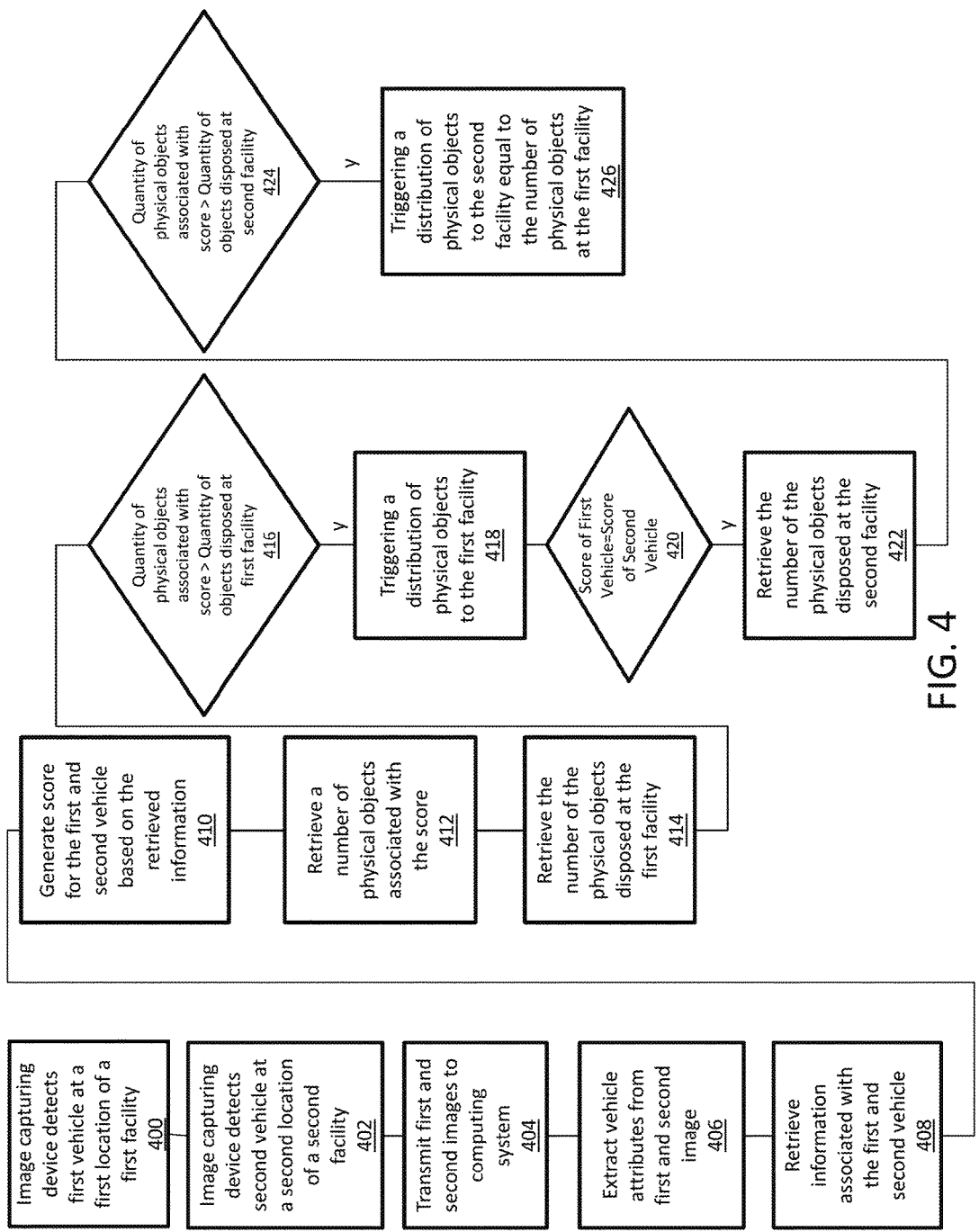
FIG. 4 is a flowchart illustrating an exemplary process implemented by embodiments of the distributed vehicle attribute detection system according to exemplary embodiments of the present disclosure.

FIG. 4 illustrates a flowchart of the vehicle attribute detection system according to the present disclosure. In operation 400, an image capturing device disposed at a first location of a first facility detects a first vehicle in response to the first vehicle entering a first field of view of the first image capturing device and to capture an first image of the first vehicle. The image capturing device can detect the first vehicle entering the field of view based on a change in the pixels.

In operation 402, an image capturing device disposed at a second location of a second facility that is remote from the first facility, a second vehicle in response to the second vehicle entering a second field of view of the second image capturing device and to capture a second image of the second vehicle.

In operation 404, the image capturing devices transmitting the images to a computing system (as shown in FIG. 2 200). The computing system includes, a video recognition system (as shown in FIG. 2 220) within a server (as shown in FIG. 2 210), a physical objects database (as shown in FIG. 2 245) and a Sighted Car Value Metrics database (as shown in FIG. 2 230). The computing system can interface with a Third Party System Database of cars and values (as shown in FIG. 2 240).

In operation 406, the computing system extracts vehicle attributes from the first image of the first vehicle and the second image of the second vehicle using the video recognition system. The vehicle attributes includes a body type, a cleanliness, custom parts, a condition of the vehicle, a type of rims on the vehicle, or a type of tire on the vehicle.

In operation 408, the computing system queries the Sighted Car Value Metrics database and/or the Third Party System Database of cars and values using the extracted attributes of the first and second vehicle to retrieve information associated with the first and second vehicle. The information associated with the first and second vehicles can include a value of the vehicle or a value of at least one of the vehicle attributes.

In operation 410, the computing system generates a score for the first vehicle and second vehicle based on the retrieved information. In operation 412, the computing system using the score of the first vehicle queries the physical objects database (as shown in FIG. 2 245) to retrieve a quantity of physical objects associated with the score. In operation 414, the computing system queries the facility database (as shown in FIG. 2 250) to retrieve the quantity of the physical objects disposed at the first facility. In operation 416, the computing system determines whether the quantity of physical objects associated with the score is less than the quantity of physical objects disposed at the first facility. In operation 418, in response to determining the quantity of physical objects disposed at the first facility are less than the quantity of physical objects associated with the score triggering a distribution of physical objects to the first facility.

In operation 420, the computing system determines whether the score of the first vehicle is equal to the score of the second vehicle. In operation 422, in response to determining the score of the first vehicle is equal to the score of the second vehicle, querying database for quantity of physical objects disposed at the second facility. In operation 424, the computing system determines whether the quantity of physical objects disposed at the second facility are less than the quantity of physical objects associated with the score. In operation 426, in response to determining, the quantity of physical objects disposed at the second facility are less than the quantity of physical objects associated with the score, triggering a distribution of physical objects with a quantity equal to the quantity of physical objects disposed at the first facility.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for detecting vehicle attributes, the system comprising:
a first image capture device;
a processor communicatively coupled to the first image capture device, one or more third party systems, and a plurality of databases, the processor configured to:
extract a plurality of vehicle attributes associated with a first vehicle from a first image captured by the image capture device at a first facility, using a machine vision algorithm;
interface with at least one of the one or more third party systems to retrieve features associated with the first vehicle using the plurality of vehicle attributes;
access a first one of the plurality of databases to retrieve information associated with at least one of the plurality of vehicle attributes and features associated with the first vehicle;
generate a first score based on the information associated with the at least one of the plurality of vehicle attributes and features;
query a second one of the plurality of databases for physical objects based on the first score;
query a third one of the plurality of databases for a quantity of the physical objects disposed at the first facility; and
in response to determining the quantity of the physical objects is less than a predetermined quantity trigger distribution of a first quantity of physical objects to the first facility,
wherein the machine vision algorithm includes one or more of: Stitching, Registration, Filtering, Thresholding, Pixel counting, Segmentation, Inpainting, Edge detection, Color Analysis, Blob discovery and manipulation, Neural net processing, Pattern recognition, Optical character recognition, Gauging, or Metrology, and
wherein the processor is further configured to generate a second score associated with a second vehicle based on a plurality of vehicle attributes from a second image of the second vehicle.

2. The system of claim 1, wherein at least one of the plurality of vehicle attributes includes a body type, a cleanliness, custom parts, a condition of the vehicle, a type of rims on the vehicle, or a type of tire on the vehicle.

3. The system of claim 1, wherein the processor is communicatively coupled to a second image capture device and the second image capturing device is configured to capture the second image of the second vehicle at a second facility.

4. The system of claim 1, wherein in response to determining the second score is equal to the score of the first vehicle, querying the third one of the plurality of databases to determine whether a second quantity of the physical objects at the second facility.

5. The system of claim 4, wherein in response to determining the second quantity of the physical objects is less than the predetermined quantity, trigger distribution of the first quantity to the second facility.

6. The system of claim 5, wherein the information associated with the first and second vehicle includes a value of the first vehicle or a value of at least one of the plurality of vehicle attributes.

7. The system of claim 1, wherein the first vehicle is detected by the first image capture camera based on a change to at least one pixel in the first field of view.

8. A method for detecting vehicle attributes, the method comprising:
extracting, via a processor, a plurality of vehicle attributes associated with a first vehicle from a first image captured by an image capture device at a first facility using a machine vision algorithm;
interfacing, via the processor, with at least one third party system to retrieve features associated with the first vehicle using the plurality of attributes;
accessing, via the processor, a first database to retrieve information associated with the at least one of the plurality of vehicle attributes and features associated with the first vehicle;
generating, via the processor, a first score based on the information associated with the at least one of the plurality of vehicle attributes and features;
querying, via the processor, a second database for physical objects based on the first score;
querying, via the processor, a third database for a quantity of the physical objects disposed at the first facility; and
in response to determining the quantity of the physical objects is less than a predetermined quantity triggering, via the processor, distribution of a first quantity of physical objects to the first facility,
wherein the machine vision algorithm includes one or more of: Stitching, or Registration, Filtering, Thresholding, Pixel counting, Segmentation, Inpainting, Edge detection, Color Analysis, Blob discovery and manipulation, Neural net processing, Pattern recognition, Optical character recognition, Gauging, or Metrology, and
wherein a second score associated with a second vehicle is generated, via the processor, based on a plurality of vehicle attributes from a second image of the second vehicle.

9. The method of claim 8, wherein at least one of the plurality of vehicle attributes includes a body type, a cleanliness, custom parts, a condition of the vehicle, a type of rims on the vehicle, or a type of tire on the vehicle.

10. The method of claim 8, wherein the second image of the second vehicle is captured by a second image capture device at a second facility.

11. The method of claim 10, further comprising querying, via the processor, the third database to determine whether a second quantity of the physical objects is at the second facility.

12. The method of claim 11, further comprising, triggering, via the processor, distribution of the first quantity to the second facility, in response to determining the second quantity of the physical objects is less than the predetermined quantity.

13. The method of claim 12, wherein the information associated with the first and second vehicles includes a value of the first vehicle or a value of at least one of the plurality of vehicle attributes.

14. The method of claim 8, wherein the first vehicle is detected by the first image capture device based on a change to at least one pixel in the first field of view.

* * * * *